Oct. 4, 1955  H. C. GRANT, JR  2,719,532
VALVE
Filed Aug. 19, 1952  3 Sheets-Sheet 1

INVENTOR.
Harry C. Grant, Jr.
BY
Ernest A. Joenen
ATTORNEY

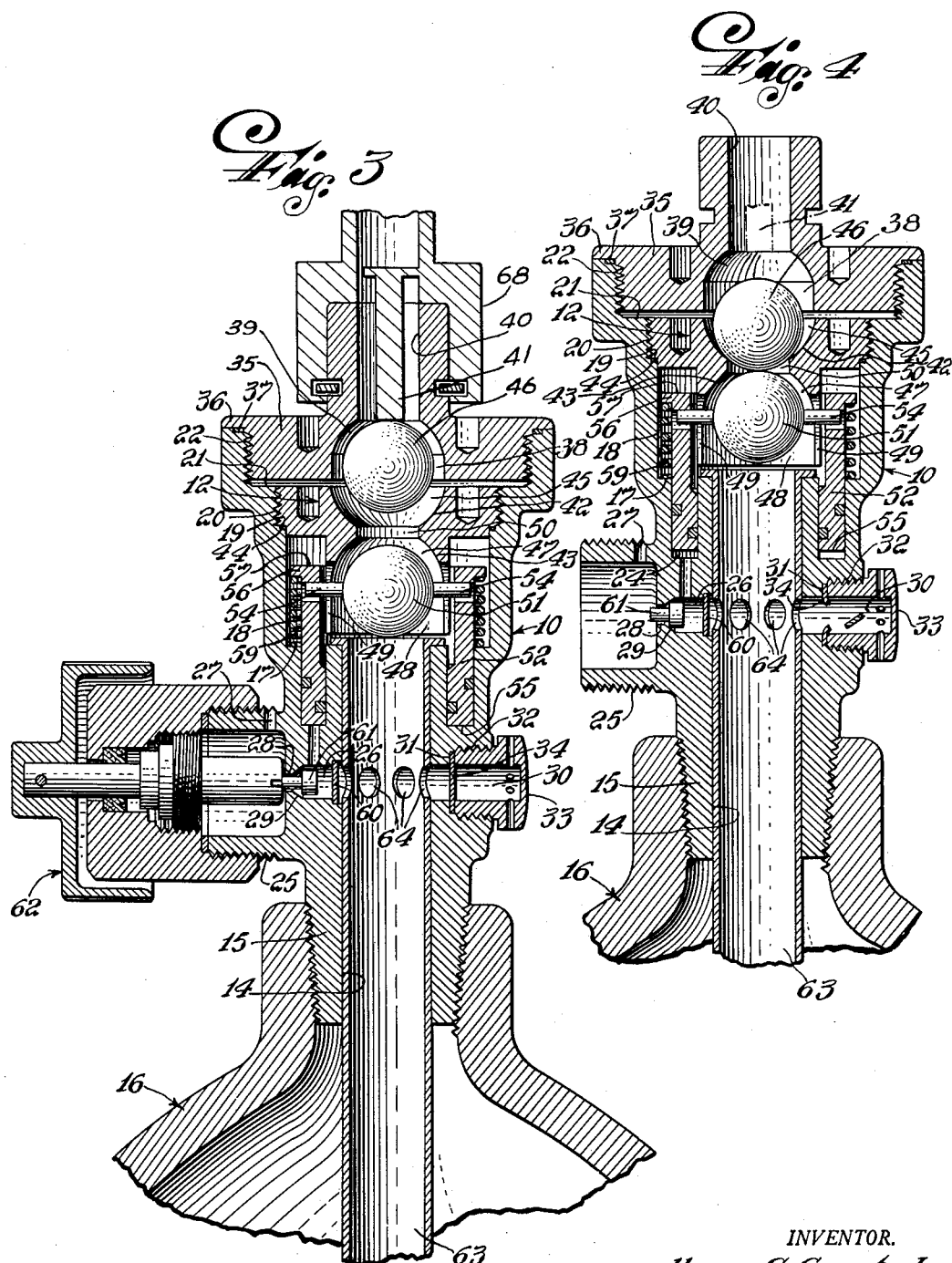

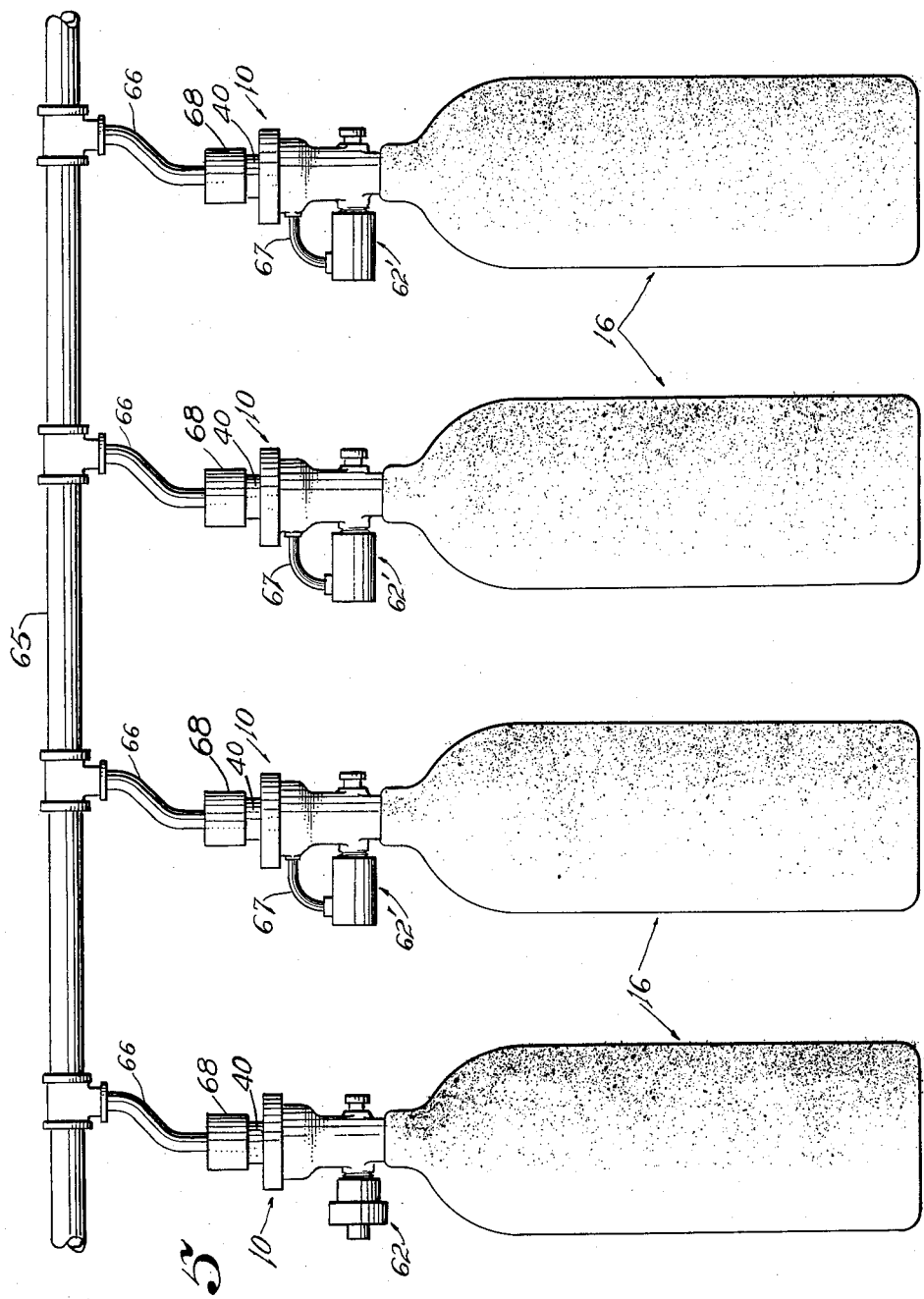

United States Patent Office 2,719,532
Patented Oct. 4, 1955

2,719,532

VALVE

Harry C. Grant, Jr., Ridgewood, N. J., assignor to Specialties Development Corporation, Belleville, N. J., a corporation of New Jersey Application August 19, 1952, Serial No. 305,175

14 Claims. (Cl. 137—68)

The present invention relates to valves, and, more particularly, to valves for receptacles containing a fluid under pressure, such as carbon dioxide, adapted for use in a fluid dispensing system comprising a plurality of receptacles connected for discharge into a common manifold for conducting the fluid to a point of use.

Accordingly, an object of the present invention is to provide an improved valve of the type wherein the valve inlet is in line with the valve outlet.

Another object is to provide an improved valve of the type wherein the pressure of the fluid in the receptacle is utilized to normally maintain the valve in its closed position and to effect opening of the valve when desired.

Another object is to provide such valves which are simple and compact in construction, are light in weight, and are economical to manufacture and assemble.

A further object is to provide such valves which prevent the loss of fluid discharged into the manifold by reason of a receptacle having burst its safety valve means or having been pierced by a projectile.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

Fig. 3 is a view similar to that of Fig. 1, illustrating the valve in its opened position.

Fig. 4 is a view similar to that of Fig. 1, illustrating the valve in a position during discharge of fluid into the manifold to which the valve is connected with the safety discharge means of the valve opened, the control head being omitted for the sake of simplicity.

Fig. 5 is a schematic view of a fluid medium dispensing system utilizing valves in accordance with the present invention.

Figure 1:
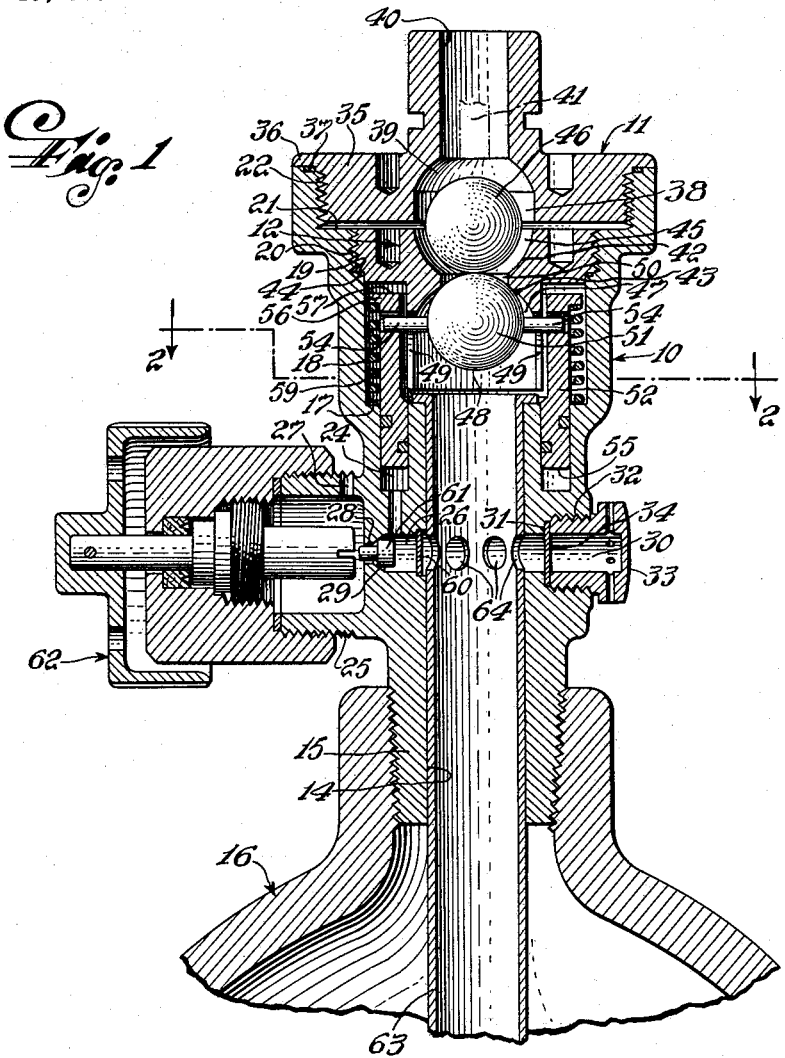
Fig. 1 is a longitudinal sectional view of a valve in accordance with the present invention and a control head therefor, illustrating the same in its normally closed position, a portion of the receptacle to which the valve is connected being shown in broken lines.
Figure 2:
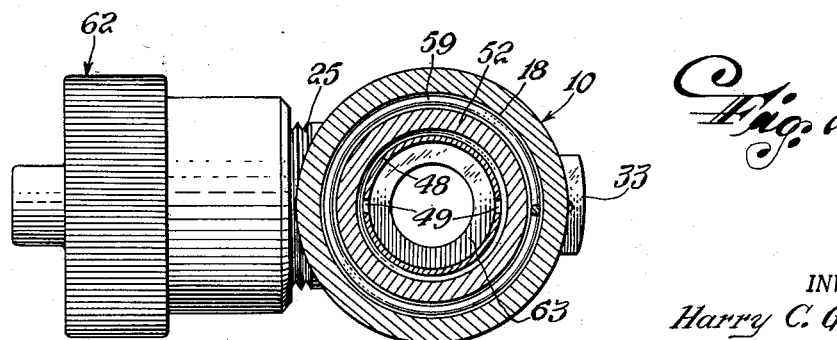
Fig. 2 is a sectional view taken along the line 2—2 on Fig. 1.

Referring to the drawings in detail and more particularly to Figs. 1 and 2 thereof, there is shown a valve having a housing comprising a body 10, a closure 11, and a partition 12.

The valve housing body 10 has an inlet at its lower end including a longitudinal bore 14, and has an externally threaded nipple section 15 at its lower end for securing the body into the outlet of a receptacle 16. The upper portion of the body increases in diameter stepwise to provide an annular shoulder 17 at the upper end of the inlet bore, a cylindrical section 18 above the shoulder 17, a second shoulder 19 at the upper end of the section 18, an internally threaded section 20 above the shoulder 19, a third shoulder 21 at the upper end of the section 20, and a second internally threaded section 22 above the shoulder 21 extending to the upper end of the body. The shoulder 17 is formed with an annular downwardly extending recess or cavity 24 of substantial depth which serves as a piston chamber section as will be made apparent hereinafter.

The body 10 further is formed with an externally threaded nipple 25 extending laterally outwardly between the nipple section 15 and the shoulder 17, and is formed with a passageway 26 extending from the inlet bore 14 to the piston chamber section 24. The nipple 25 has a vent aperture 27 and an opening 28 provided with a valve seat 29 extends from the passageway 26 to the interior of this nipple. As shown herein, a lateral bore or conduit 30 formed with a shoulder 31 and a threaded section 32 extends from the inlet bore 14 to the exterior of the body at a point diametrically opposite the end of the passageway 26 communicating with the inlet bore. A conventional anti-recoil plug 33 threadedly secured in the section 32 retains a safety disc 34 on the shoulder 31, the disc being adapted to burst when the pressure of the fluid in the receptacle becomes excessive.

The closure 11 comprises an externally threaded plug section 35 secured in the body section 22, a flange 36 at the upper end carrying a gasket 37 for engaging the upper end of the body 10 to form a seal between the body and the closure, an outlet including a valve chamber section 38 formed with a downwardly facing valve seat 39 and a nipple 40 in alignment with the inlet bore 14. The nipple 40 is adapted for attachment to a fitting (not shown) for connecting the valve outlet to a discharge manifold of a fluid dispensing system. This fitting carries a stop member 41 which extends into the nipple 40, as shown in broken lines, when the nipple and the fitting are attached for the purpose described hereinafter.

The partition 12 is threadedly secured to the threaded section 20 of the valve housing body and carries a gasket 44 forming a seal between the partition and the second shoulder 19 of the body. The partition further comprises an upper valve chamber section 45 cooperating with the valve chamber section 38 of the closure to provide a chamber for a valve member 46, a lower valve chamber section 47 including a depending tubular extension 48 formed with a pair of diametrically opposite longitudinal slots 49, and a port 50 in alignment with the inlet bore 14 and the outlet nipple 40 and having an upwardly facing valve seat 42 and a downwardly facing valve seat 43 at the respective sides thereof.

The valve member 46 is adapted to engage the valve seat 39 or the valve seat 42 to serve as a check valve as will be described hereinafter, and a valve member 51 is adapted to engage the valve seat 43 to control the discharge of fluid through the port as about to be described.

Preferably, movement of the valve member 51 on and off its seat is effected by means operable by the pressure of the fluid in the container. Such means include an annular generally cylindrical, sleeve-like piston 52 which is disposed in a piston chamber provided by the annular recess 24, the cylindrical section 18 of the housing body, the underside of the partition and the tubular extension 48, the valve member 51 being connected for movement with the piston by pins 54 extending through the slots 49 and being movable therein.

The lower end portion of the piston is slidably disposed in the annular recess 24 and has an annular lower end surface 55 which is adapted to be subjected to the pressure of fluid entering the recess by means of the passageway. The area of the surface 55 is much greater than the area of the valve member 51 which seals the port 50, for example, about twice as great. The effective area at the upper end of the piston on which pressure medium acts is equal to the area of the surface 55.

The upper end of the piston is formed with an outwardly extending flange 56 having an annular end surface 57, and a cylindrical helical spring 59 surrounds the piston, and has its upper end engaging the piston flange 56 and has its lower end seated on the shoulder 17 of the housing body. The spring is only sufficiently strong to normally urge the piston upwardly and cause the valve member 51 carried by the piston to engage its seat and close the port 50 when the receptacle is empty.

In order to control the pressure of the fluid in the annular recess 24 to operate the valve in the manner about to be described, a flow restricting means such as a porous metallic disc 60 is positioned in the passageway 26 adjacent its end at the inlet bore 14, and a pilot valve member 61 is provided for the seat 29 of the venting opening 28. The pilot valve member is normally seated by the pressure of fluid in the passageway and is adapted to be unseated to vent the passageway and the annular piston recess by operating a control head 62 shown by way of example as being of the locally operable hand wheel type.

In operation, when the receptacle 16 contains fluid under pressure, the combined force of the pressure of the fluid acting on the ball 51 and on the lower end surface 55 of the piston and the force of the spring 59 exceed the force of the pressure of the fluid acting on the effective area at the upper end of the piston, whereby the piston is urged upwardly to cause the valve member 51 to close the port 50. In order to unclose the port and effect discharge of the fluid in the receptacle, the control head 62 is operated as shown in Fig. 3 to unseat the pilot valve member 61 whereby fluid under pressure in the passageway 26 and the piston recess 24 is rapidly vented to the atmosphere by means of the opening 28 and the vent aperture 27. When the foregoing occurs, the force of the pressure of the fluid acting on the effective area at the upper end of the piston exceeds the force of the pressure of the fluid acting on the valve member 51 and the force of the spring 59, whereby the piston is driven downwardly to move the valve member 51 off its seat and fluid is discharged through the port 50. The flow restricting disc 60 prevents pressure from building up in the piston recess while the valve member is unseated. When the fitting carrying the stop 41 is attached to the nipple, the valve member 46 engages this stop and is prevented from engaging the seat 39 and closing off the outlet passage (Fig. 3). However, should this fitting be detached and the valve be opened, the valve member 46 engages its seat 39 to prevent the discharge of fluid to the atmosphere.

In Fig. 4, the valve is shown with its safety outlet opened by reason of the safety disc 34 having burst. Should this occur or should the receptacle have been pierced by a projectile, fluid flowing from the manifold (not shown) to the valve outlet is prevented from passing through the port 50 by the valve member 46 which is then disposed on its seat 42, whereby loss of fluid from the manifold is prevented.

In the event the valve shown and so far described herein is to be utilized for controlling the discharge of liquid carbon dioxide or other liquid under pressure, a syphon tube 63 is positioned in the inlet bore 14. This tube is provided with an annular zone of circumferentially spaced apertures 64 in fluid flow communication with the passageways 26 and 30.

While a locally manually operable control head 62 has been shown by way of example, it will be appreciated that a fluid medium pressure operated control head could likewise be utilized to unseat the pilot valve member 61, and that fluid medium in the manifold could be conducted to the piston of such a control head by a passageway extending from the manifold or from a point in the valve chamber above the port 50.

In Fig. 5, a fluid pressure medium storing and dispensing system, such as a carbon dioxide fire extinguishing system is illustrated schematically, which comprises a plurality of receptacles 16 each equipped with a valve in accordance with the present invention, a manifold 65 into which the fluid stored in the receptacles is to be discharged, and conduits 66 connecting the outlet nipples 40 of each of the valves with the manifold, the lower ends of these conduits including a removable fitting 68 which carries the stop 41.

The receptacle 16 at the left, as viewed, has its valve equipped with a control head 62, such as shown in Figs. 1 to 3, and constitutes the master cylinder of the system. The valves of the other three receptacles are equipped with a pressure actuated control head 62' of the type disclosed in my prior United States Patent No. 2,352,627 wherein a cylinder or pressure chamber is connected in fluid flow communication with the discharge passageway at a point downstream of the port 50 by means of a passageway herein shown as a tube or conduit 67. It will be appreciated, without further illustration, that the passageway could extend through the body of the valve and the body of the control head in any suitable manner.

The control heads 62' are under the control of the master cylinder in the sense that, upon discharge of the pressure medium of the master cylinder into the manifold, a portion of this medium is effective to actuate these control heads to cause the valves associated therewith to be opened.

From the foregoing description, it will be seen that the present invention provides a novel and improved valve which is highly useful in its field of application.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. A valve comprising a housing having an inlet and an outlet, a partition between said inlet and said outlet having a port formed with a valve seat facing said inlet, said housing having a generally annular piston chamber section formed with an open end facing said port, an annular piston having a portion slidably disposed in said piston chamber section and having a bore for conducting fluid from said inlet to said port, a valve member carried by said piston adapted to cooperate with said valve seat to control the flow of fluid through said port, and means for controlling the movement of said piston.

2. A valve comprising a housing having an inlet and an outlet, a partition between said inlet and said outlet having a port formed with a valve seat facing said inlet and having a tubular extension facing said inlet formed with longitudinal slot means, said housing having a generally annular chamber section formed with an open end facing said port and cooperating with said tubular extension to provide a piston chamber, an annular piston having a portion slidably disposed in said annular section and having a bore for conducting fluid from said inlet to said port, a valve member adapted to cooperate with said valve seat to control the flow of fluid through said port, means extending through said slot means for connecting said valve member to said piston, and means for controlling the movement of said piston.

3. A valve comprising a housing having an inlet and an outlet and a port between said inlet and said outlet formed with a valve seat facing said inlet, said housing having a generally annular piston chamber section formed with an open end facing said port and having an annular shoulder surrounding said open end, an annular piston having one end slidably disposed in said piston chamber and having a bore for conducting fluid from said inlet to said port and having a peripheral flange at its other end facing said shoulder, a valve member carried by said piston adapted to cooperate with said valve seat to control the flow of fluid through said port, a cylindrical spring surrounding said piston having its ends engaging said shoulder and said flange respectively, and valve means operatively connected to said piston chamber section for controlling the movement of said piston.

4. A valve comprising a housing having an inlet and an outlet, a partition between said inlet and said outlet having a port formed with a valve seat facing said inlet and having a tubular extension facing said inlet formed with a pair of diametrically opposite longitudinal slots, said housing having a generally annular chamber section formed with an open end facing said port cooperating with said tubular extension to provide a piston chamber and having an annular shoulder surrounding said open end, an annular piston having one end slidably disposed in said annular section and having a bore for conducting fluid from said inlet to said port and having a peripheral flange at its other end facing said shoulder, a valve member within the bore of said piston adapted to cooperate with said valve seat to control the flow of fluid through said port, means extending through said slots for connecting said valve member to said piston, and valve means operatively connected to said piston chamber section for controlling the movement of said piston.

5. A valve comprising a housing having an inlet and an outlet and a port between said inlet and said outlet formed with a valve seat facing said inlet, said housing having a valve chamber and a piston chamber in communication with said valve chamber formed with an annular section facing said port and having a passageway between said inlet and said piston chamber section; an annular piston having one end slidably disposed in said piston chamber and having a bore for conducting fluid from said inlet to said port; a valve member carried by said piston adapted to cooperate with said valve seat to control the flow of fluid through said port; flow restricting means in said passageway; and valve means including an opening in said passageway between said flow restricting means and said piston chamber section for venting said section, and a valve member for controlling said opening.

6. A valve comprising a housing having an inlet and an outlet and a port between said inlet and said outlet formed with a valve seat facing said inlet, said housing having a valve chamber and a piston chamber in communication with said valve chamber formed with an annular section facing said port and having a passageway between said inlet and said piston chamber section; an annular piston having one end slidably disposed in said piston chamber and having a bore for conducting fluid from said inlet to said port; a valve member carried by said piston adapted to cooperate with said valve seat to control the flow of fluid through said port; resilient means for urging said piston in a direction to cause said valve member to engage its seat; flow restricting means in said passageway; and valve means including an opening in said passageway between said flow restricting means and said piston chamber section for venting said section, and a valve member for controlling said opening.

7. A valve comprising a housing having an inlet including a bore and having an outlet and a port between said inlet and said outlet formed with a valve seat facing said inlet, said housing having a valve chamber and a piston chamber in communication with said valve chamber formed with an annular section facing said port and having a passageway between said inlet bore and said piston chamber section; an annular piston having one end slidably disposed in said piston chamber and having a bore for conducting fluid from said inlet to said port; a valve member carried by said piston adapted to cooperate with said valve seat to control the flow of fluid through said port; flow restricting means in said passageway; a syphon tube in said inlet bore having an aperture in alignment with said passageway; and valve means including an opening in said passageway between said flow restricting means and said piston chamber section for venting said section, and a valve member for controlling said opening.

8. A valve comprising a housing having an inlet including a bore and having an outlet and a port between said inlet and said outlet formed with a valve seat facing said inlet, said housing having a valve chamber and a piston chamber in communication with said valve chamber formed with an annular section facing said port and having a passageway between said inlet bore and said piston chamber section; an annular piston having one end slidably disposed in said piston chamber and having a bore for conducting fluid from said inlet to said port; a valve member carried by said piston adapted to cooperate with said valve seat to control the flow of fluid through said port; flow restricting means in said passageway; a syphon tube in said inlet bore having an aperture in alignment with said passageway; safety discharge means for said housing including a conduit in communication with said inlet bore; said syphon tube having a second aperture in alignment with said conduit; and valve means including an opening in said passageway between said flow restricting means and said piston chamber section for venting said section, and a valve member for controlling said opening.

9. A valve according to claim 8, wherein said conduit and the end of said passageway adjacent said inlet bore are diametrically opposite and said syphon tube has a plurality of pairs of diametrically opposite apertures.

10. A valve comprising a housing having an inlet including a bore and having an outlet and a port between said inlet and said outlet formed with a valve seat facing said inlet, said housing having a valve chamber and a piston chamber and a passageway between said inlet bore and said piston chamber; a piston for said piston chamber; a valve member carried by said piston adapted to cooperate with said valve seat to control the flow of fluid through said port; a syphon tube in said inlet bore having an aperture in alignment with said passageway; and valve means in said passageway for controlling the operation of said piston.

11. A valve comprising a housing having an inlet including a bore and having an outlet and a port between said inlet and said outlet formed with a valve seat facing said inlet, said housing having a valve chamber and a piston chamber and a passageway between said inlet bore and said piston chamber; a piston for said piston chamber; a valve member carried by said piston adapted to cooperate with said valve seat to control the flow of fluid through said port; a syphon tube in said inlet bore having an aperture in alignment with said passageway; safety discharge means for said housing including a conduit in communication with said inlet bore; said syphon tube having a second aperture in alignment with said conduit and valve means in said passageway for controlling the operation of said piston.

12. A valve comprising a housing having an inlet and an outlet and a port between said inlet and said outlet formed with a valve seat at each side thereof, said housing having a first valve chamber between said inlet and said port and a second valve chamber between said outlet and said port, a valve member in said first chamber, means including a piston and a spring acting against said piston normally causing said valve member to engage one of said seats said piston being operable under the influence of fluid medium under pressure from said inlet to move said valve member off its seat, a valve member in said second chamber adapted to engage said other seat in response to the flow of fluid from said outlet towards said inlet, and a valve seat in said second chamber adapted to receive said valve member therein to close said outlet.

13. A valve comprising a housing having an inlet and an outlet and a port between said inlet and said outlet formed with a valve seat facing said inlet, said housing having a generally annular piston chamber section in communication with said inlet and formed with an open end facing said port, an annular piston having an end portion slidably disposed in said piston chamber section and having a bore for conducting fluid from said inlet to said port, a valve member carried by said piston adapted to cooperate with said valve seat to control the flow of fluid through said port, and means for controlling the movement of said piston, said effective area of said piston end portion being substantially greater than the area of said valve member closing said port.

14. A valve according to claim 13, wherein said means include a spring only sufficiently strong to normally urge said piston in a direction to cause said valve member to engage its seat.

References Cited in the file of this patent

UNITED STATES PATENTS

| | | |
|---|---|---|
| 615,881 | McIntosh | Dec. 13, 1898 |
| 1,477,722 | Slattery | Dec. 18, 1923 |
| 1,644,093 | Shonnard | Oct. 4, 1927 |
| 1,703,861 | Bohnhardt | Mar. 5, 1929 |
| 2,383,961 | Freygang | Sept. 4, 1945 |
| 2,580,426 | Heigis | Jan. 1, 1952 |